(12) United States Patent
Wang et al.

(10) Patent No.: US 7,909,417 B2
(45) Date of Patent: Mar. 22, 2011

(54) BRAKING CONTROL SYSTEM FOR VEHICLE

(75) Inventors: Dexin Wang, Livonia, MI (US); Rena Basch, Ann Arbor, MI (US); Yitzong Chern, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 958 days.

(21) Appl. No.: 11/565,879

(22) Filed: Dec. 1, 2006

(65) Prior Publication Data
US 2008/0133098 A1 Jun. 5, 2008

(51) Int. Cl.
*B60T 8/32* (2006.01)
(52) U.S. Cl. .................... 303/196; 303/177; 303/183
(58) Field of Classification Search .............. 303/194, 303/196, 155, 175, 176, 177, 183, 185, 189; 701/48; 340/436
See application file for complete search history.

(56) References Cited

U.S. PATENT DOCUMENTS

| | | | |
|---|---|---|---|
| 5,061,932 A * | 10/1991 | Tribe et al. ................. 342/70 |
| 5,461,565 A | 10/1995 | Sakane et al. |
| 6,041,277 A | 3/2000 | Batistic et al. |
| 6,058,340 A | 5/2000 | Uchiyama et al. |
| 6,380,849 B1 | 4/2002 | Eckstine et al. |
| 6,484,089 B1 | 11/2002 | Millington |
| 6,532,407 B1 | 3/2003 | Fuehrer et al. |
| 6,926,373 B2 | 8/2005 | Burkhard et al. |

* cited by examiner

*Primary Examiner* — Xuan Lan Nguyen
(74) *Attorney, Agent, or Firm* — Frederick Owens; Brooks Kushman P.C.

(57) ABSTRACT

A braking control system and method for a vehicle improves vehicle stability and steerability. When a braking torque is being applied and a road disturbance is detected, the braking torque may be reduced as the vehicle traverses the road disturbance. Subsequently, when the road disturbance has been traversed, the braking control system may allow the application of braking torque as requested by a braking device. The reduction in braking torque when traversing road disturbances minimizes the physical impact experienced by the vehicle wheels.

20 Claims, 3 Drawing Sheets

BRAKING CONTROL SYSTEM FOR VEHICLE

TECHNICAL FIELD

The embodiments described herein relate to a braking control system for a vehicle.

BACKGROUND

It is well known that while driving a vehicle over certain road surfaces, road disturbances (e.g., potholes) increases the possibility of damaging tires, wheels and suspension components. In the case of some road disturbances, it is recommended that drivers apply vehicle brakes just before traversing the disturbance, yet avoid braking while the vehicle wheels are directly over the disturbance. However, due to traffic conditions, driving habits, human response, and imprecise brake timing control, manual application of the brakes as recommended is not always feasible. Thus, there is a need for a braking control system that is configured to optimally control the braking system as a vehicle traverses various road disturbances (e.g., potholes and the like). The embodiments described herein were conceived in view of these and other concerns related to braking controls.

SUMMARY

A braking control system and method for a vehicle is disclosed wherein the vehicle has multiple wheels. The method includes sensing whether a speed of the vehicle has reached a first predetermined vehicle speed. The method also includes sensing whether a braking torque is being applied to at least one of the vehicle wheels. The method further includes detecting a disturbance of a road in an area within the vicinity of the at least one wheel. Accordingly, the method includes reducing the braking torque when the first predetermined vehicle speed has been reached, a road disturbance has been detected, and the braking torque is being applied.

A braking control system for a vehicle is disclosed, wherein the vehicle has multiple wheels and a braking system adapted to apply a braking torque on at least one of the wheels. The system includes a speed sensor for sensing whether a speed of the vehicle has reached a first predetermined vehicle speed. Additionally, a controller is included that is operable with the speed sensor and the controller senses whether a braking torque is being applied to at least one of the vehicle wheels. The controller is also configured to detect a disturbance on a road in an area within a vicinity of the at least one wheel. Upon the detection of the disturbance the controller generates signals for reducing braking torque when the first predetermined vehicle speed has been reached, the road disturbance has been detected and the braking torque is being applied.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE EMBODIMENT(S)

Figure 1A:
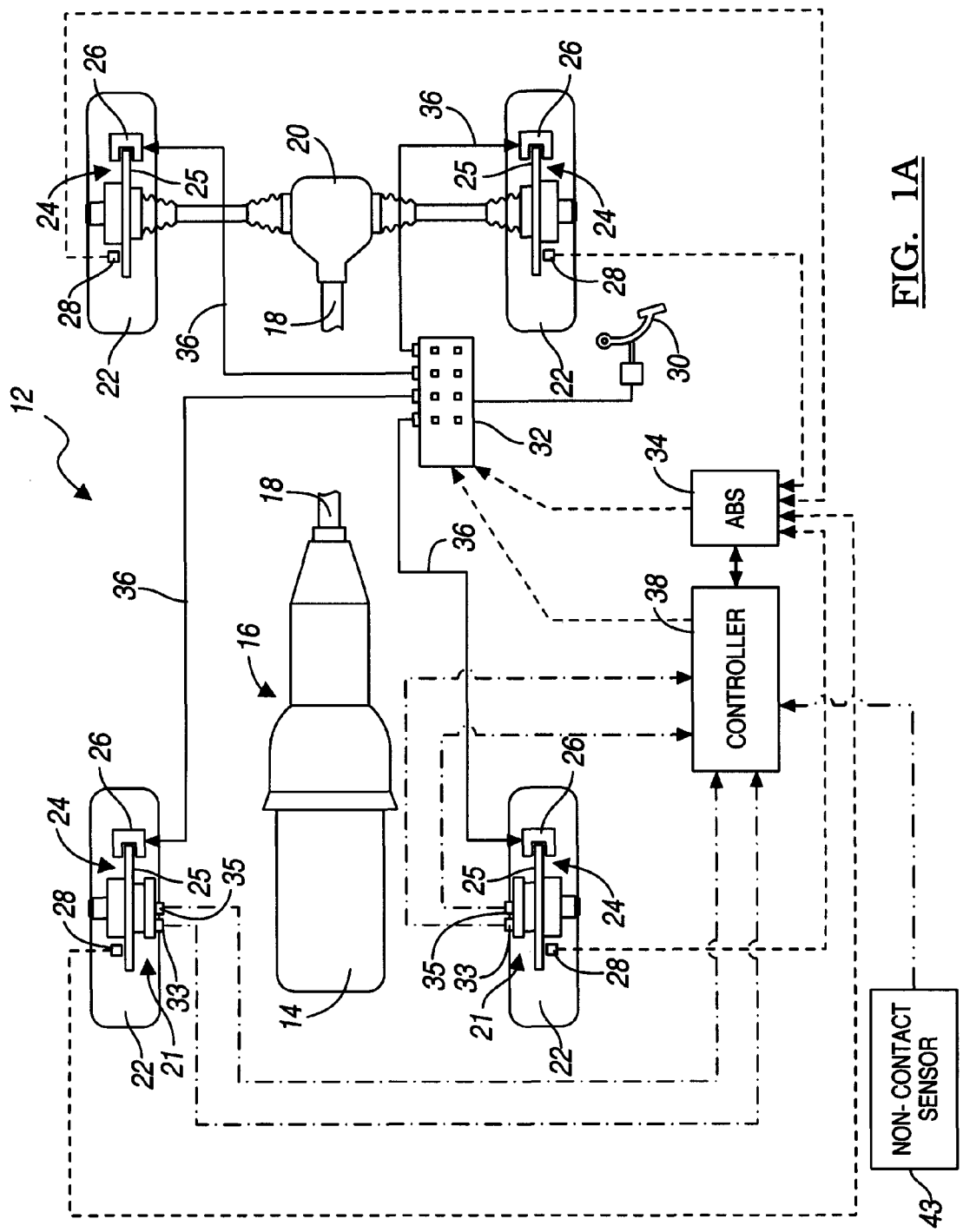
FIG. 1A illustrates a vehicle having a braking control system in accordance with an embodiment of the present invention.

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Referring to FIG. 1, a vehicle 12 is illustrated that enables monitoring and compensation of friction braking for improved vehicle steerability and stability. As recognized by one of ordinary skill in the art, vehicle 12 may include a powertrain having an engine 14, a transmission 16 and a drive shaft 18. Drive shaft 18 mechanically couples transmission 16 to a differential 20. Differential 20 is mechanically coupled to wheels 22 thereby enabling movement of vehicle 12 in response to motive force from engine 14.

Vehicle 12 further includes friction brakes 24. Brakes 24 include a brake disc 25, a caliper 26, and a speed sensor 28 that communicates with an anti-lock braking system (ABS) module 34. Caliper 26 is operable with brake disc 25 for slowing and/or stopping vehicle 12. ABS module 34 is operable with a pressure adjustment unit 32 to control wheel slip. In response to a brake request from a brake pedal 30, pressure adjustment unit 32 is configured to enable proper distribution of braking fluid to brakes 24 through the use of pressure passages 36. The distribution of braking fluid enables caliper 26 to exert a desired braking torque on wheels 22. Although the embodiment shown in FIG. 1 illustrates a braking system that utilizes hydraulics, it is recognized that the friction braking system of FIG. 1 may be a pure brake-by-wire (BBW) system, an electromechanical braking system or a hydro-mechanical braking system without departing from the scope of the present invention.

Figure 1B:
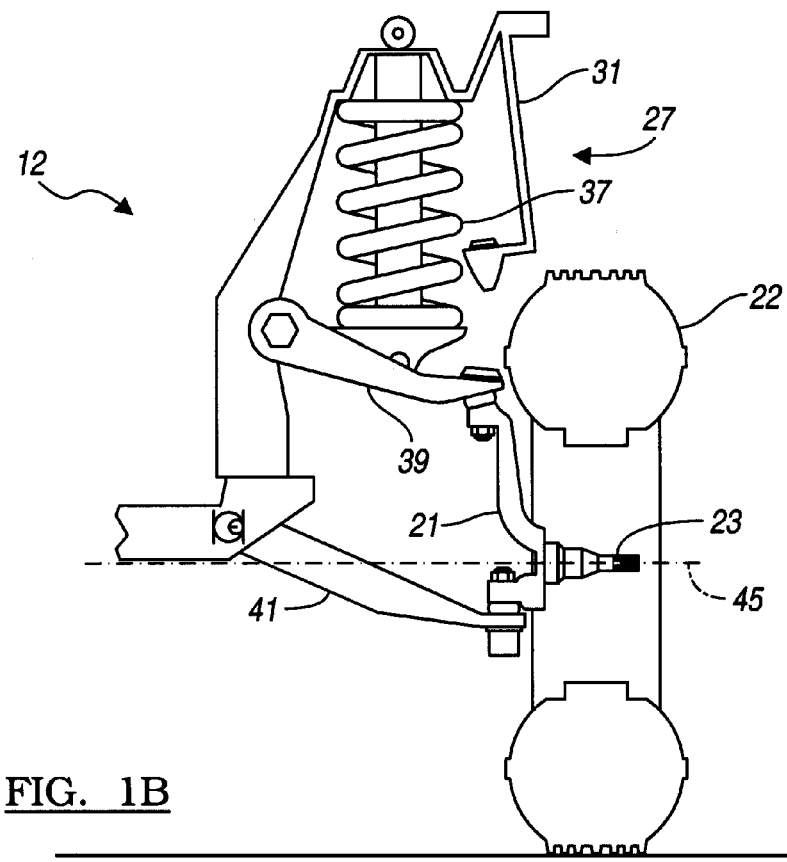
FIG. 1B illustrates an enlarged view of a suspension system for the vehicle of FIG. 1A.

As shown in FIG. 1B, vehicle 12 includes a suspension system 27 that enhances vehicle stability while minimizing the effects of road noise, bumps, potholes and the like (i.e. road disturbances). The suspension system 27 includes a coil spring 37, an upper control arm 39, a knuckle 21 having a spindle 23 and a lower control arm 41. Also, as recognized by one of ordinary skill in the art, a body 31 is coupled to vehicle 12.

FIGS. 1A and 1B illustrate a knuckle 21 being connected to wheel 22. As recognized by one of ordinary skill, knuckle 21 connects upper control arm 39 to a lower control arm 41. A spindle 23 also forms part of knuckle 21 and connects knuckle 21 to wheel 22.

A position sensor 33 and an accelerometer 35 are both operable with the suspension system via knuckle 21. Alternative embodiments may have position sensor 33 and an accelerometer 35 connected to other components of suspension system 27. Position sensor 33 is configured to sense the position of knuckle 21 and generate signals for controller 38 that are indicative of the position of knuckle 21. For example, position sensor 33 may sense whether the movement of knuckle 21 is positive or negative with respect to a reference or equilibrium position 45 (FIG. 1B). Particularly, as a result of a road disturbance, knuckle 21 may move upward away from reference position 45 thereby experiencing positive displacement. Accordingly, position sensor 33 is configured to sense the vertical position of knuckle 21 with respect to reference position 45. Alternatively, while traversing some road surfaces, knuckle 21 may move downward as the suspension system 27 adjusts with respect to reference position 45. In such a case, the downward movement may be considered negative displacement with respect to reference position 45. As recognized by one of ordinary skill in the art, downward motion of wheel 22 is commonly referred to as a wheel rebound while upward motion of wheel 22 is commonly referred to as jounce.

Accelerometer 35 detects the acceleration of the suspension system 27 (e.g., knuckle 21). The vertical acceleration of a suspension component may by detected by accelerometer 35 and used in determining whether a vertical force is being applied to wheel 22. Based on sensing by accelerometer 35, the velocity of suspension system 27 may also be determined, which may be used when detecting certain road disturbances. As such, in one embodiment, accelerometer 35 and position sensor 33 enable the sensing of a rebound velocity of wheel 22, which enables a determination of whether wheel 22 is moving in the direction of a rebound. In one embodiment, the rebound velocity is derived from the acceleration of the wheel as sensed by accelerometer 35. Additionally, the rebound velocity includes the velocity of wheel 22 (or a component of suspension system 27) as it moves in a downward direction while traversing a road surface.

Controller 38 has data storage and processing functionality. Controller 38 receives and processes the signals generated by position sensor 33 and accelerometer 35, which indicate the position, acceleration and/or velocity of suspension components (e.g., knuckle 21). Based on the received signals, controller 38 is adapted to detect a disturbance on a road in an area within a vicinity of wheel 22, which includes situations where wheel 22 is actually experiencing the road disturbance. For example, as wheel 22 traverses a road disturbance such as a pothole, the position sensor 33 and accelerometer 35 sense both position and acceleration of knuckle 21 and transmit the corresponding position, acceleration and velocity signals to controller 38. In response, controller 38 processes the received signals and determines that wheel 22 is traversing the pothole.

In one embodiment, the road disturbance may be detected based on a vertical force being applied to wheels 22. The vertical force may be caused by the road surface, the bottom surface of a road disturbance (e.g., a pothole) or the trailing edge of the road disturbance. The absence of a vertical force may indicate that wheel 22 has lost contact with the road surface. Through the use of controller 38, position sensor 33 and accelerometer 35, the vertical force, if any, may be determined based on the vertical position and vertical acceleration of a suspension component. The road disturbance may then be detected depending upon the magnitude of the vertical force as compared to a "design load" for the vehicle.

The design load may be an estimated weight of the vehicle that assumes certain weight contributions from passengers, vehicle cargo, and the like. For example, a small car may have a design load of 3,000 Newtons (N) for a single wheel. A heavy duty truck may have a design load of 8,000N for a single wheel. It is recognized, however, that the design load varies from vehicle to vehicle depending on the size and weight of the vehicle.

In one embodiment, a comparison of the vertical force with a design load threshold indicates a position of the wheel 22 with respect to a road surface. For example, if the vertical force experienced by a wheel 22 is less than one-fourth of the design load (referred to as load threshold), this may indicate that wheel 22 has lost contact with the road surface. Such an indication may indicate that wheel 22 is traversing a pothole and the like.

When controller 38 determines that a road disturbance is being traversed and that braking torque is being exerted on wheel 22, controller 38 generates signals for reducing the applied braking torque to minimize the impact experienced by wheel 22 as a result of the road disturbance.

In one embodiment, the reduction in braking torque occurs upon the controller 38 sensing whether the applied braking torque is greater than a braking threshold. In one embodiment, the braking threshold may be 0.3 times the acceleration of gravity ($g=9.8$ m/s$^2$). In such an embodiment, when a road disturbance is detected, controller 38 may generate signals for a reduction in applied braking torque when the applied braking torque is greater than 0.3 g.

Controller 38, via signals received from position sensor 33 and accelerometer 35 is also configured to determine when a vehicle wheel has completely traversed the road surface having a road disturbance. If the controller determines that the road disturbance has been completely traversed by wheel 22, controller 38 generates signals for applying braking torque to wheel 22 in an amount requested by the brake pedal 30. For instance, if the velocity of wheel 22 is not in a rebound direction and there is a positive displacement of wheel 22 as a result of the vertical force, controller 38 enables the application of braking torque without a reduction in braking torque as described above. In one embodiment, the application of braking torque as requested by the braking device is allowed after two R/V seconds, wherein R is an unloaded radius of wheel 22 and V is the vehicle speed. It is recognized, however, that alternative embodiments may have other means for delaying the application of braking torque as requested by a braking device without departing from the scope of the present invention.

Alternatively, detection of a road disturbance by vehicle 12 may occur through the use of a non-contact sensor 43 (FIG. 1A). In such an embodiment, position sensor 33 and accelerometer 35 may not be required. In one non-limiting aspect of the invention, non-contact sensor 43 may be an ultrasonic proximity sensor or an optical sensor such as a laser radar configured to recognize road surfaces. As vehicle 12 travels on a road surface, sensor 43 may be in continuous operation to sense upcoming road disturbances. Accordingly, signals indicative of the road disturbance are transmitted to controller 38 for processing. Controller 38 may then generate signals to reduce the application of braking torque until the road disturbance is completely traversed. Upon complete traversal of the road disturbance braking torque may be applied to wheel 22 after 2R/V seconds as described above.

Figure 2:
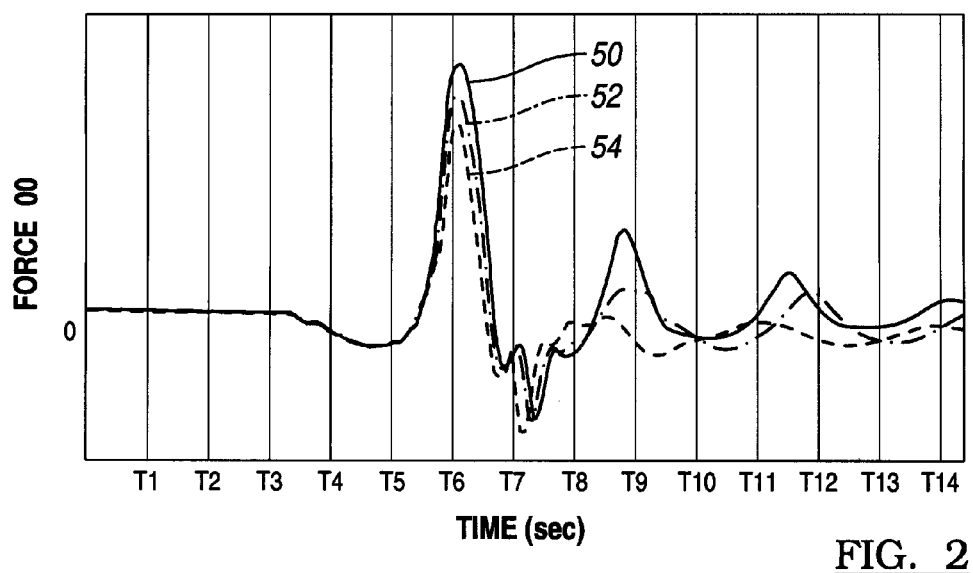
FIG. 2 illustrates exemplary wave forms illustrating the force experienced by a vehicle wheel while traversing a road surface.

Now, referring to FIG. 2, a graph illustrates various waveforms 50, 52 and 54 illustrating the amount of force experienced by a vehicle wheel while traversing a road disturbance. Waveform 50 illustrates the force experienced by a wheel on a vehicle having a conventional braking system that does not reduce the amount of applied braking torque upon the detection of the road disturbance. Waveform 52 is an exemplary waveform in accordance with one embodiment of the present invention, that illustrates a reduction in braking torque by approximately 50% when the vehicle wheel traverses a road disturbance. Waveform 54 illustrates yet another exemplary waveform in accordance with a non-limiting embodiment, wherein the braking torque is reduced by 100% when traversing the road disturbance.

In FIG. 2, for explanation purposes and not as a limitation, the waveforms 50, 52 and 54 assume a vehicle traveling at about 30 miles per hour (mph). As shown, beginning just after a time T3, the force exerted on the wheel drops by several newtons. Such a drop may indicate that the vehicle wheel has momentarily lost contact with the road surface due to the dept of the road disturbance. However, around T5, the force exerted on the wheel increases dramatically. The dramatic increase in force may be an indication that the vehicle wheel has contacted an edge of a road disturbance (e.g., a trailing edge of a pothole). As shown by waveform 50, just after T5, the vehicle wheel experiences the greatest amount of force when contacting the edge of the road disturbance. However, in accordance with the braking control system described above, a reduction in braking torque of 50%, as demonstrated by wave form 52, shows that the force exerted on the wheel is reduced. Additionally, as demonstrated by waveform 54, a 100% reduction in applied braking torque as the wheel contacts the edge of the road disturbance allows the greatest reduction in force applied to the wheel by the road surface. The reduction in applied force minimizes the chance of wheel damage while improving vehicle stability and steerability. From about T7 through T14, the wave forms 50, 52 and 54 illustrate oscillation of the wheel after the road disturbance has been completely traversed. It is recognized that although the waveforms 52 and 54 were described with respect to specific points in time, alternative embodiments may vary without departing from the scope of the present invention.

Figure 3:
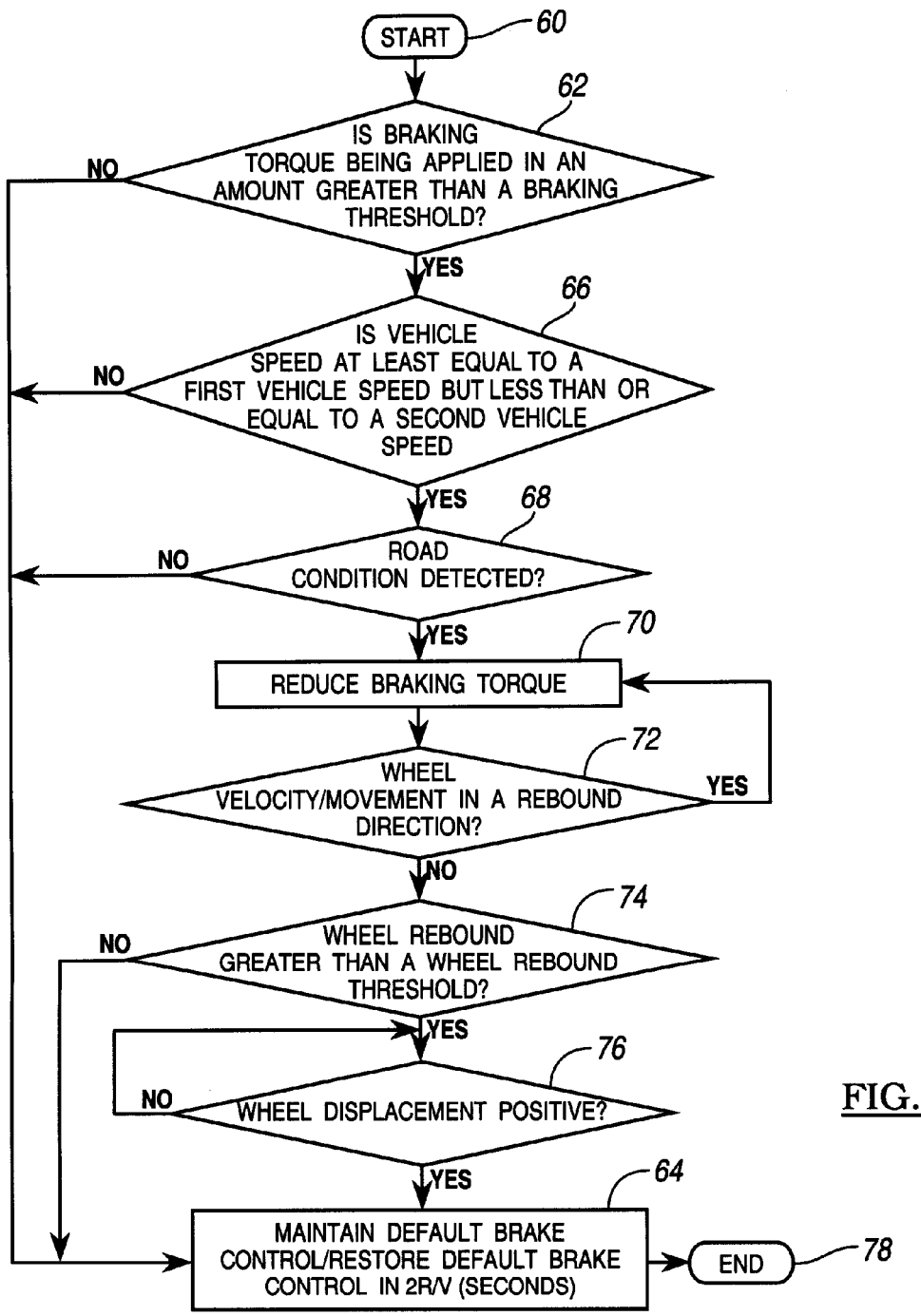
FIG. 3 is a flow chart of a method for controlling a braking system in accordance with an embodiment of the present invention.

Referring to FIG. 3, a flow chart illustrates a method for controlling the braking system when a road disturbance is being traversed. Block 60 is the entry point into the method. Block 62 depicts a determination of whether a braking torque is being applied in an amount greater than a braking threshold. If there is no applied braking torque or the applied braking torque is less than the braking threshold a block 64 occurs. At block 64 the default brake control is maintained, which includes applying braking torque as requested by a braking device (e.g., brake pedal 30 of FIG. 1A) without reducing the applied braking torque in accordance with the embodiments disclosed herein. Accordingly, after block 64 the method ends at block 78.

If the braking torque being applied is greater than the braking threshold, as determined at block 62, block 66 occurs. At block 66 the method includes determining whether the vehicle speed is at least equal to a first vehicle speed but less than or equal to a second vehicle speed. In one embodiment, although not necessarily, the first vehicle speed may be 15 miles per hour while the second vehicle speed may be 55 miles per hour. If block 66 is true (i.e., yes), a block 68 occurs. However, if block 66 is not true (i.e., no), block 64 occurs.

At block 68, the method determines whether a road disturbance has been detected. As described above, the road disturbance may be detected by processing signals from the position sensor and accelerometer or the non-contact sensor. If a road disturbance is detected, the applied braking torque is reduced as depicted by block 70. At block 72 the method determines whether the velocity of the wheel is in a rebound direction or the wheel's movement is in the direction of a rebound. If the velocity of the wheel is in the rebound direction or the wheel's movement is in the direction of a rebound, the method returns to block 70 to continuously reduce the applied braking torque. If not, the method advances to block 74.

It is recognized that although the vehicle wheel may not be moving in the rebound direction, the wheel may be in a rebound position. Accordingly, at block 74, the method determines whether a wheel rebound is greater than a wheel rebound threshold. In one embodiment, the wheel rebound threshold may be a specific distance of the wheel from the equilibrium position of the wheel. If the wheel rebound is not greater than the rebound threshold, a block 64 occurs wherein the default brake control is restored in 2R/V seconds, which may include activation of ABS controls. If the wheel rebound is greater than the wheel rebound threshold, a block 76 occurs. At block 76 the method determines whether the wheel displacement is positive. If so, a block 64 occurs, wherein braking torque is applied as requested by a braking device (i.e., default brake control) in 2R/V seconds. The method ends at block 78. It is recognized, however, that the method illustrated by FIG. 3 may be rearranged and modified without departing from the scope of the invention.

While the best mode for carrying out the invention has been described in detail, those familiar with the art to which this invention relates will recognize various alternative designs and embodiments for practicing the invention as defined by the following claims.

What is claimed:

1. A braking method comprising:
   sensing whether a vehicle speed has reached a first predetermined vehicle speed;
   sensing whether a braking torque is being applied to at least one vehicle wheel;
   detecting a pothole within a vicinity of the at least one wheel; and
   reducing braking torque when the first predetermined vehicle speed has been reached, the pothole has been detected and the braking torque is being applied.

2. The method of claim 1, wherein sensing whether the braking torque is being applied includes sensing whether the braking torque exceeds a predetermined braking threshold greater than zero.

3. The method of claim 1, wherein detecting the pothole includes:
   detecting a vertical position of a suspension component being connected to the wheel;
   detecting a vertical acceleration of the suspension component; and
   determining a vertical force being applied to the wheel based on the vertical position and vertical acceleration, wherein the vertical force being less than a predetermined load threshold provides an indication of the pothole.

4. The method of claim 3, wherein the predetermined load threshold includes a threshold having a value that is one fourth of a design load of the vehicle.

5. The method of claim 1, further comprising:
   sensing whether the wheel is moving in a direction of a rebound, wherein the direction is determined by sensing the acceleration and determining a rebound velocity of the wheel based on the acceleration;
   sensing whether a displacement of the wheel is positive; and
   applying braking torque, as requested by a braking device, when the wheel is not moving in a direction of a rebound and the displacement is positive.

6. The method of claim 5, wherein applying braking torque, as requested by the braking device, occurs after 2R/V seconds, wherein R is an unloaded radius of the wheel and V is the vehicle speed.

7. The method of claim 1, further comprising:
sensing whether the vehicle speed is less than a second predetermined vehicle speed;
wherein reducing braking torque when the first predetermined vehicle speed has been reached includes reducing braking torque when the vehicle speed is between the first predetermined vehicle speed and the second predetermined vehicle speed.

8. The method of claim 1, further comprising:
detecting whether the at least one wheel has completely traversed the pothole; and
applying braking torque, in an amount requested by a braking device, when the at least one wheel has completely traversed the pothole.

9. The method of claim 1, further comprising:
restoring a default brake control when the at least one wheel has completely traversed the pothole.

10. The method of claim 9, wherein the default brake control includes activation of an anti-lock braking system (ABS) control.

11. A braking control system for a vehicle having multiple wheels and a braking system adapted to apply a braking torque on at least one of the wheels, the system comprising:
a speed sensor for sensing whether a speed of the vehicle has exceeded a first predetermined vehicle speed threshold greater than zero; and
a controller being operable with the speed sensor and sensing whether a braking torque is being applied to at least one of the vehicle wheels, the controller being configured to detect a pothole on a road in an area within a vicinity of the at least one wheel and generate signals for reducing braking torque when the first predetermined vehicle speed threshold has been exceeded, the pothole has been detected and the braking torque is being applied.

12. The system of claim 11, further comprising:
a non-contact sensor that senses the pothole, wherein the controller detects the pothole based upon signals received from the non-contact sensor.

13. The system of claim 11, further comprising:
an accelerometer that senses a vertical acceleration of the wheel;
a position sensor that senses a displacement of the wheel; and
wherein the controller determines whether movement of the wheel is in a direction of a rebound based on the sensed wheel acceleration, the controller generating signals for applying braking torque, as requested by a braking device, when the wheel movement is not in a direction of a rebound, and the displacement is positive.

14. The system of claim 13, wherein the controller generates signals for applying braking torque, as requested by the braking device, after 2R/V seconds, wherein R is an unloaded radius of the wheel and V is the vehicle speed.

15. The system of claim 11, wherein the speed sensor senses whether the speed of the vehicle is equal to or less than a second predetermined vehicle speed; and
the controller generates signals for reducing braking torque when the speed of the vehicle is equal to or less than the second predetermined vehicle speed.

16. The system of claim 11, wherein the controller is further configured to:
detect whether the at least one wheel has completely traversed the pothole; and
restore a default brake control when the at least one wheel has completely traversed the pothole.

17. The system of claim 16, wherein the default brake control includes applying braking torque in an amount requested by a braking device.

18. The system of claim 16, wherein the default brake control includes activation of an anti-lock braking system (ABS) control.

19. A method for controlling a braking system of a vehicle having multiple wheels and at least one suspension component being connected to at least one of the wheels, the method comprising:
sensing whether a speed of the vehicle is between a first predetermined vehicle speed and a second predetermined vehicle speed;
sensing whether a braking torque is being applied to at least one of the vehicle wheels in an amount greater than a predetermined braking threshold;
detecting a disturbance on a road in an area within a vicinity of the at least one wheel by:
detecting a vertical position of the suspension component being connected to the wheel;
detecting a vertical acceleration of the suspension component; and
determining a vertical force being applied to the wheel based on the vertical position and vertical acceleration, wherein the vertical force provides an indication of the road disturbance;
reducing braking torque when the vehicle speed is greater than the first predetermined vehicle speed but less than the second predetermined vehicle speed, the road disturbance has been detected and the braking torque is being applied in an amount greater than the predetermined braking threshold;
sensing whether the wheel is moving in a direction of a rebound, wherein the direction is determined by sensing the acceleration and determining a rebound velocity of the wheel based on the acceleration;
sensing whether a wheel rebound is greater than a predetermined wheel rebound threshold; and
applying braking torque, as requested by a braking device, an amount of time after the wheel is not moving in the direction of a rebound and the wheel rebound is less than the predetermined wheel rebound threshold.

20. The method of claim 19,
wherein the mount of time is approximately equal to 2R/V seconds, wherein R is an unloaded radius of the wheel and V is the vehicle speed.

* * * * *